Aug. 30, 1932.   A. HELLER   1,874,996
STEAM HEATED BOILING VESSEL
Filed Feb. 17, 1931
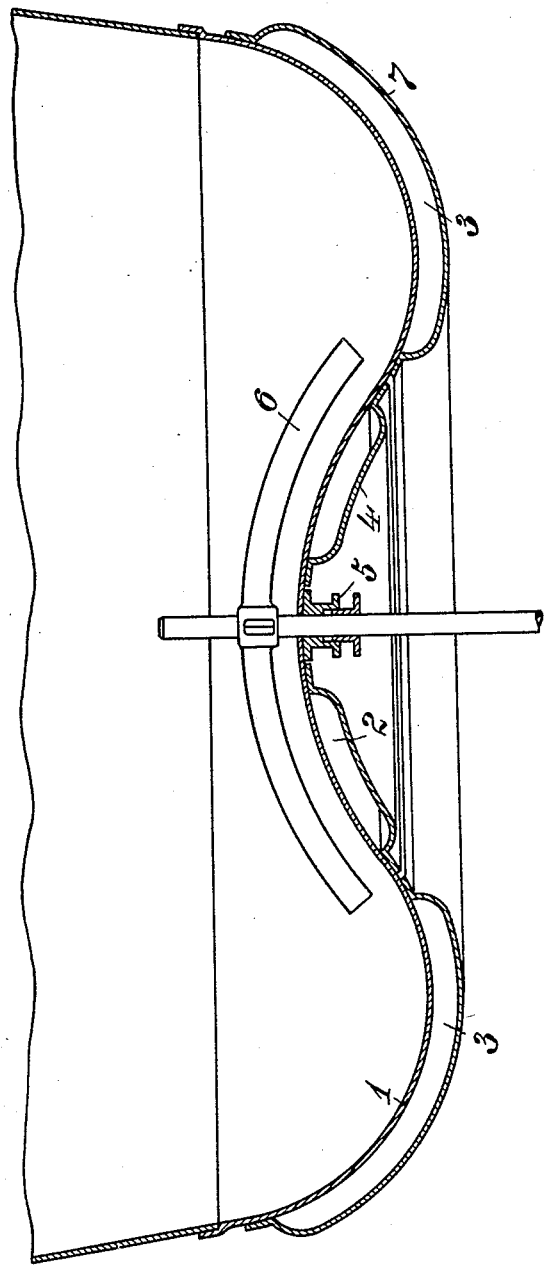
Inventor:
Alfred Heller
By
Emil Börnelykke
Attorney Patented Aug. 30, 1932

1,874,996

UNITED STATES PATENT OFFICE

ALFRED HELLER, OF MAHLOW NEAR POTSDAM, GERMANY, ASSIGNOR TO WEIGELWERK AKTIENGESELLSCHAFT, OF NEISSE-NEULAND, GERMANY

STEAM HEATED BOILING VESSEL

Application filed February 17, 1931, Serial No. 516,457, and in Germany May 14, 1930.

My invention relates to steam-heated boiling vessels.

In order to obtain high vaporization in vessels of this class, the liquid contained in the vessel must have a very low level, the heating surface of the vessel must be as large as possible and the vessel must admit the use of steam of high pressure. More particularly the wort boiling vessels used in breweries must meet these requirements in order to obtain a satisfactory wort and beer.

A low level in the wort boiler affords the advantage, more particularly when the boiler has a large heating surface and is heated by high pressure steam, of the wort being powerfully fluttered up to the surface whereby any discoloration of the wort is prevented which is inavoidable with boilers of high wort level.

My invention has for its object so to improve boiling vessels, more particularly brewer's boilers, that the above-mentioned requirements are met in a particularly satisfactory manner.

In order that my invention may be more readily understood, an embodiment of the same is illustrated by way of example in the accompanying drawing which is a vertical section through such a boiler.

In this drawing 1 denotes the inner bottom wall of the boiler made from copper, iron or any other suitable material. According to my invention the bottom is formed in cross section by three arcs of circles merging into one another, the central arc being convex so as to inwardly vault the central portion of the bottom. The two adjoining arcs extend in opposite direction so as to outwardly vault the outer portion of the bottom.

It is of course understood, that bottoms come within the scope of the idea of my invention which are confined in cross section by curved lines other than but equivalent to the above-described arcs of circles.

This shape of the bottom affords the advantage that the liquid in the vessel, such as brewer's wort has a low level, that the heating surface is increased when compared with the normal hemispherical bottoms, and that there is a very efficient heating surface in the midst of the bottom, that is below the shallowest place of the liquid.

The known hemispherical bottoms had to be calculated as to their radius so as to withstand the steam pressure. In the present case the wall thicknesses are very small, as their calculation is determined by the three comparatively small radii of the arcs of the bottom.

I further provide, in connection with my above-described boiler, heating jackets in such a manner that the bottom wall 1 is not exposed at all to the direct heating action of the steam on that annular place where the central convex wall portion merges into the outer concave one. To this end my invention further provides two annular steam jackets 2 and 3 arranged on the outer side of the bottom wall 1 as will be seen from the drawing: The shell 2 formed by jacket 4 and which forms a central heating jacket, extends from the stuffing box case 5 of the agitator 6 up to the annular place where the central convex bottom portion merges into the outer concave portion, while the outer annular steam jacket 3 formed by shell 7 begins close to but outside of this annular place and extends up to the outer edge of the bottom.

Besides the advantages already set forth my improved structure affords the further advantage which, true, is already obtained in some older brewer's boilers, that steam of different pressure can be used for heating the two annular steam jackets.

What I claim as my invention is:—

1. A boiling apparatus comprising a vessel; and at least two jackets secured to the bottom of the vessel forming a central jacket and an outer jacket, said jackets adapted to receive a medium for heating the material in the vessel.

2. A steam-heated boiling apparatus comprising a vessel; and at least two shells welded to the bottom of the vessel forming a central jacket and an outer jacket to receive steam for heating the material in the vessel.

3. A boiling apparatus comprising a vessel; at least two jackets secured to the bottom of the vessel forming a central jacket and an outer jacket, said jackets adapted to receive a medium for heating the material in the vessel; and an agitator in the vessel for agitating the material to be heated.

4. A steam-heated boiling apparatus comprising a vessel; and two shells welded to the bottom of the vessel forming a central ring jacket and an outer ring jacket to receive steam for heating the material in the vessel.

5. A steam-heated boiling apparatus comprising a vessel; two shells welded to the bottom of the vessel forming a central ring jacket and an outer ring jacket to receive steam for heating the material in the vessel; and an agitator in the vessel for agitating the material to be heated.

In testimony whereof, I have affixed my signature.

ALFRED HELLER.